April 23, 1957  G. O. LYLE ET AL  2,789,630
AUTOMOBILE SEAT CUSHION AND BACK HALF COVER
Filed June 21, 1955  3 Sheets-Sheet 1

INVENTORS
Gaylord O. Lyle and
Addie M. Lyle,
By Herbert A. Vainturn,
ATTORNEY

April 23, 1957   G. O. LYLE ET AL   2,789,630
AUTOMOBILE SEAT CUSHION AND BACK HALF COVER
Filed June 21, 1955   3 Sheets-Sheet 2

INVENTORS
Gaylord O. Lyle and
Addie M. Lyle.
By Herbert A. Minturn
ATTORNEY

INVENTORS
Gaylord O. Lyle and
Addie M. Lyle,
By Herbert A. Weinturn
ATTORNEY

2,789,630

AUTOMOBILE SEAT CUSHION AND BACK HALF COVER

Gaylord O. Lyle and Addie Mae Lyle, Columbus, Ind.

Application June 21, 1955, Serial No. 517,014

4 Claims. (Cl. 155—182)

This invention relates to a seat cover primarily designed to fit over the driver's side of the front automobile cushion and back for the purpose of protecting that portion of the front seat which is in the majority of cases used more often than is the right hand portion of the seat and back. The invention further is particularly useful in protecting the seats and back over that area which may become dirty due to the fact that the driver does not change his clothes after working on some dirty job when he is in a hurry to go after some parts or the like.

A primary object of the invention is to provide a "half" front seat and back cover which may be very readily applied and removed as the situation may demand. In accomplishing this object, the construction of the cover is made such that it will fit snugly and neatly over the driver's side of the seat and the back thereof so that there will be no wrinkles and also so that the cover will remain in position even under the sliding in and out under the steering wheel by the driver.

A further important object of the invention is that which derives from the fact that all the attaching means is elastic and requires no tacks or pins to secure the cover in position. At the same time, the elastic means are entirely out of the way and are not subject to being sat upon at any time.

It is contemplated that the invention may be applied equally as well to the right hand side as well as to the left hand side of the front seat and back, wherein the cover may be made either in right or left hand forms or both, particularly where the entire seat is to be covered, in which case the right and left hand portions may be applied to the seats and back.

These and many other objects and advantages of the invention will become apparent to those versed in the art in the following description of one particular form of the invention as illustrated in the accompanying drawings, in which—

Figure 1:
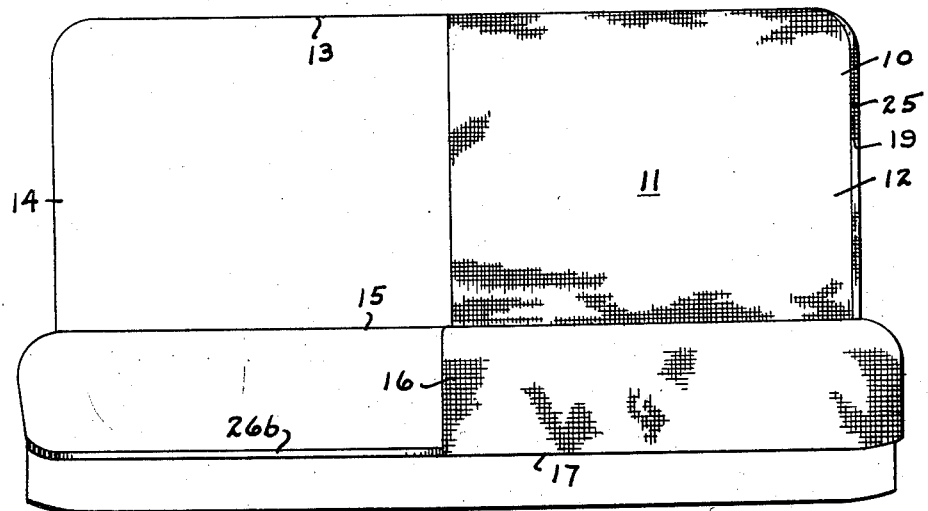
Fig. 1 is a view in front elevation of a front automobile seat to which the invention is applied.
Figure 2:
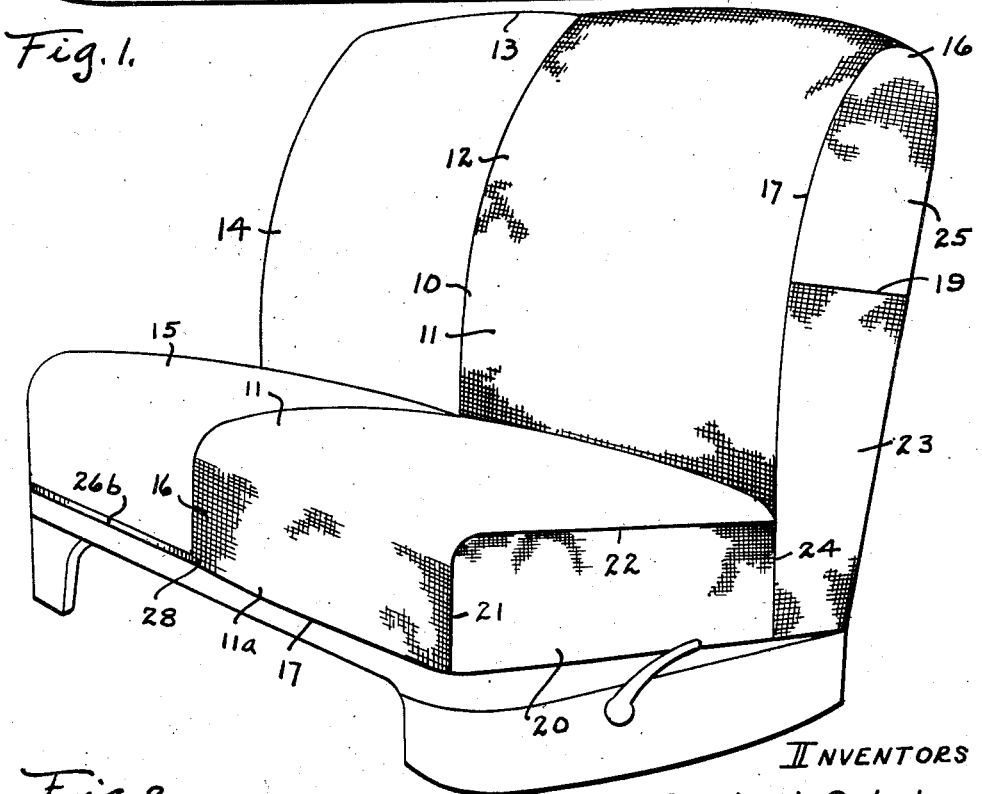
Fig. 2 is a view in left hand end perspective of the seat with cover attached.
Figure 3:
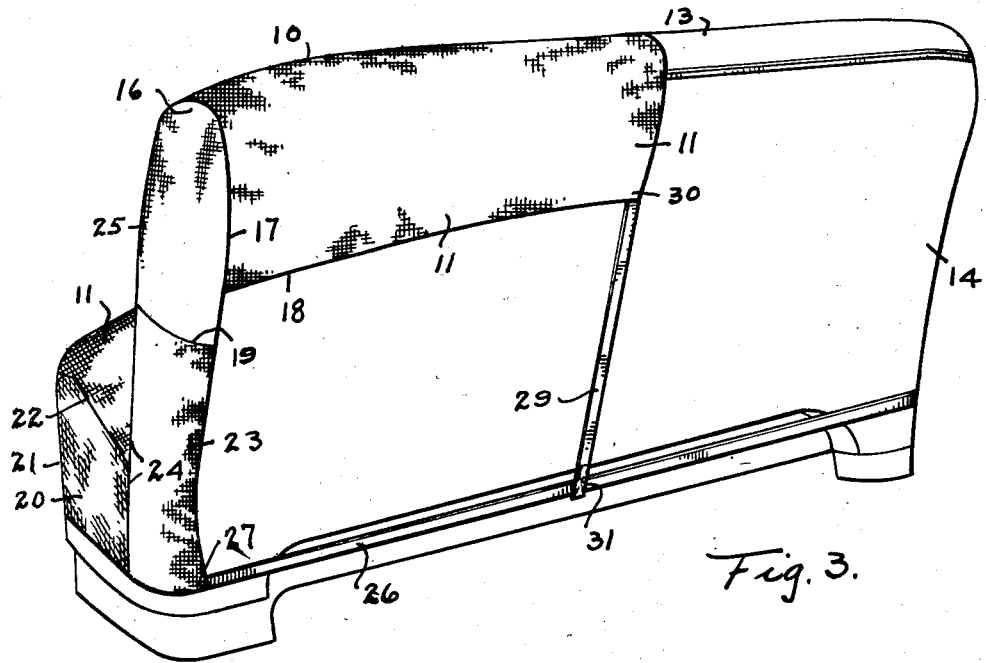
Fig. 3 is a view in rear perspective.
Figure 4:
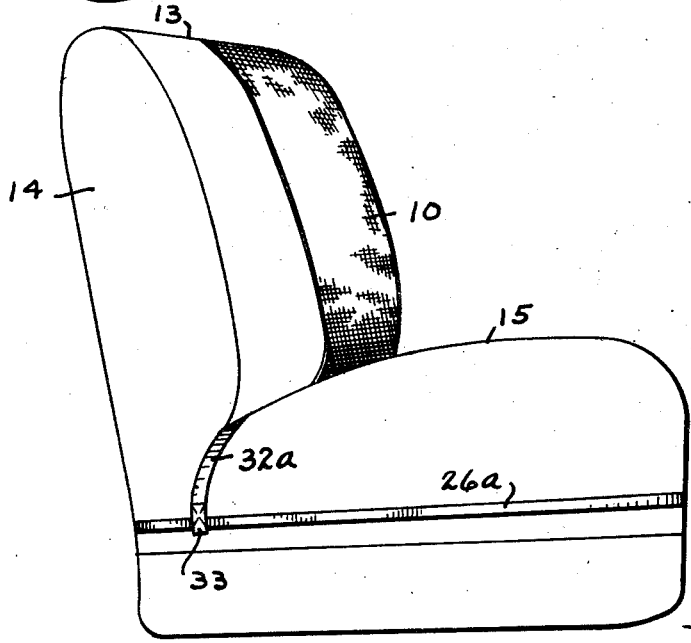
Fig. 4 is a view in right hand end perspective.

The seat cover generally designated by the numeral 10 has a major area panel 11 constituting the back 12 which extends from a line below the rear side of the top 13 of the back 14 around over the top 13 downwardly over the front side of the back 14 and then forwardly over the seat 15 and downwardly through an apron portion 16 to a lower edge 17. This panel 11 may be made out of a single length of material. The material may be any suitable one preferably a woven material in which the fibres may be synthetic or partially synthetic and wool and cotton or any one of those three materials all as may be desired. The material itself does not constitute a part of the invention per se. To the left hand marginal edge portion of the panel 11 there is secured such as by stitching an upper elastic end panel 25 which is elastic substantially horizontally but substantially non-elastic vertically. This panel 25 has an arcuate upper end 16 so that the panel 25 may be engaged to a relatively forward portion of the panel 11, and the panel 25 has its edges extending from that arcuate end 16 united not only with the forward portion of the panel 11 at the upper end thereof, but also down and around rearwardly through the seam line 17 to the lower edge 18 of the panel 11 which extends across the back side of the seat back 14. The panel 25 terminates on a lower essentially horizontal line 19, at a distance slightly below the edge 18, Fig. 3.

A second panel 20 has its forward edge united through a seam 21 with the apron 16 along a vertical line, and is also secured to the panel 11 across the seat length through the seam 22.

A side panel 23 is united across its top end with the panel 25 lower line 19 in a seam therealong. The forward substantially vertical edge of the panel 23 is secured to the panel 11 between the lines 19 and 22 and is continued to be secured downwardly to the rear end of the panel 20 through the seam 24.

These four sections of material sewed together in the manner just described, are proportioned so that the combined structure will fit over the seat 15, and the back 14 snugly, requiring some stretch of the elastic panel 25 to bring the overlapping upper end portion of the panel 11 into a smooth fit around over the upper portion of the back 14 from the front side over the edge 13 and downwardly on the rear side of the line 18. The structure is held in a taut condition so as to present smooth surfaces throughout its various individual panel elements by elastic means described as follows.

An elastic tape 26 is secured by one end to the lower corner 27 at the rear side thereof of the panel 23. This tape 26 is made to have a length sufficient to carry it entirely across the rear side of the back 14, Fig. 3, and then forwardly along the right hand portion of the seat 14 by the length 26a, to the front side of the seat, and then toward the left of the seat across the front side of the lower portion thereof by a length 26b to unit in a fixed manner with the panel 11 at the lower right hand corner 28 of the front skirt portion 11a.

Figure 5:
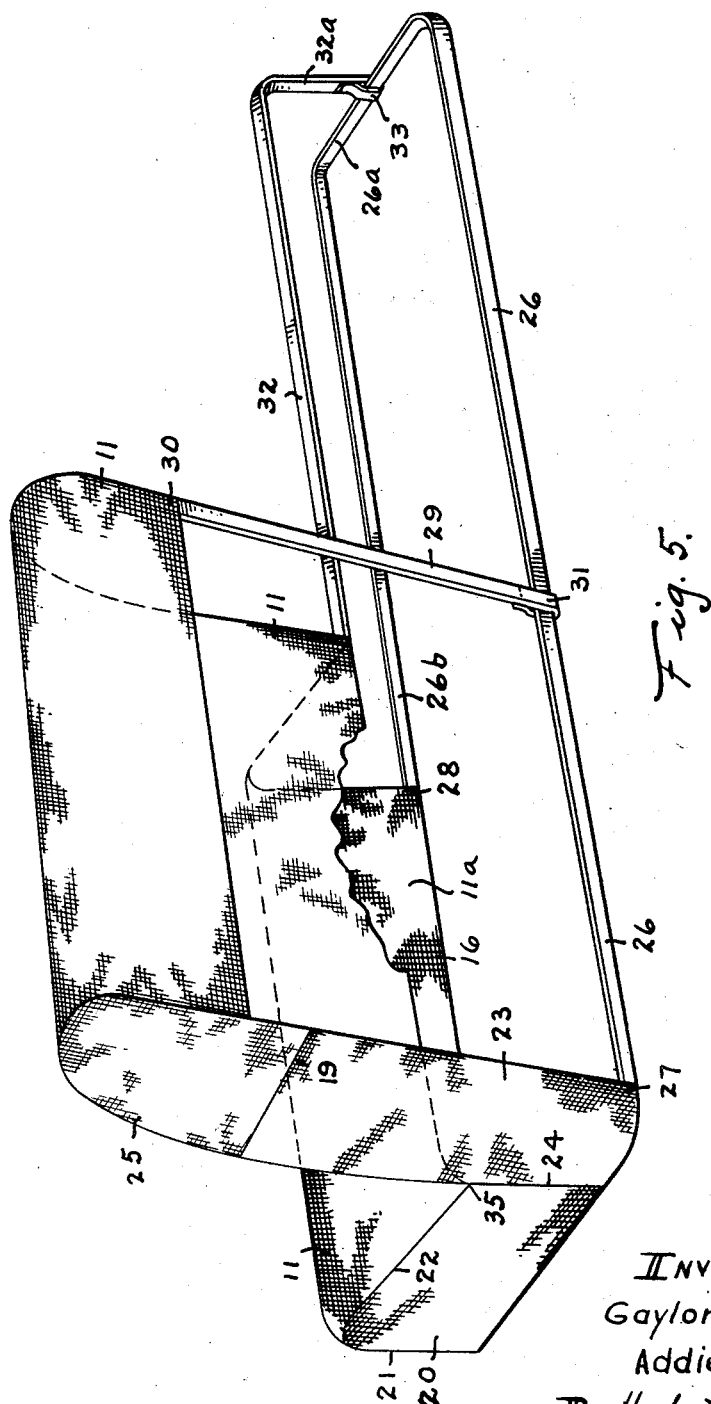
Fig. 5 is a view in perspective of the seat cover detached from the seat and back.

A second elastic tape 29 is secured by an upper end to the corner 30 at the back right hand end of the panel 11 back of the seat back 14, Fig. 5. This tape 29 drops downwardly behind the back 14 and engages around the tape 26 by a loop 31 through which the tape 26 is free to slide.

A third tape 32 is secured to the right hand edge of the panel 11 at a zone adjacent the back panel 12. This tape 32 is carried across within the meeting zone of the seat cushion 15 and the back 14 and thence downwardly at the right hand end by a length 32a to engage by a loop 33 around the elastic length 26a, Fig. 5, so that the loop 33 is free to be shifted therealong. The length of these three elastic tapes are made to be such that they are required to be stretched in order to hold the various elements of the cover 10 tautly as above indicated, and as is shown throughout several views in the drawings.

Thus by placing the cover 10 over the seat 15 on the left hand end thereof in the present showing, and carrying the cover up over the back 14 to have it fit downwardly over the upper portion of that back as indicated, with the tapes being looped around the seat, and in the case of the tape 29 downwardly therebehind, the cover will be pulled into a taut condition and will remain in place until positively removed. As indicated at the juncture 35 between the panel 11, side apron 20, and the end panel 23, there will be a certain fullness left in the panel 11 where it is joined to the panel 20 and 23 to permit the panel 11 to be pulled back into the crevice between the back 14 and the seat 15 so that the cross tape 32 may be concealed in the continuation of that crevice to the right. By reason of the loop 33 being employed to engage the tape length 26a, the tape 32 may be pulled snugly down into that crevice by sliding the loop 33 toward the rear end portion of the tape length 26a. Likewise the generally vertically disposed tape 29 may have its loop shifted along the tape 26 to cause the corner 30 of the panel 11 to be stretched downwardly into the right as may be required to secure the smooth fit.

While we have herein shown and described our invention in the one particular form, it is obvious that structural variations may be employed all without departing from the spirit of the invention, and we therefore do not desire to be limited to that precise form beyond the limitations which may be imposed by the following claims.

We claim:

1. For protecting a seat and a back, a cover comprising a major panel extending from a line rearwardly of and below the top of said back by an area over the top and down the front side to and across the top side of said seat by a seat area, and extending downwardly therefrom into an apron, said major panel being less in length across the seat laterally than that of the seat and its back; an elastic end panel spaced above the seat and interconnecting the end of the rear back portion of said major panel with the corresponding end portion of the panel on the front side of the back; a third panel fixed to the lower end of said elastic panel and along said major panel end therebelow extending to substantially the lower end of said apron; a fourth panel extending forwardly from said third panel and secured along said seat area and skirt end of said major panel in an approximate inverted L line; a tape elastic in part of its length at least interengaging said major panel skirt at its lower corner opposite from said fourth panel and extending by a length sufficient to carry it across the front and end sides of said seat and around across its back to interengage with the lower rear corner of said third panel; a second tape elastic in part at least of its length interengaging said major panel at a zone at the juncture of said seat and back front-side areas and extending from that zone over the seat and downwardly to engage said first tape at the side of the seat; a third tape elastic in part at least of its length interengaging the corner of said major panel on the rear side of said back and extending downwardly to and engaging said first tape.

2. The structure of claim 1 in which said second and third tapes each slidingly engages said first tape for variable positioning of its connection therealong.

3. A seat cover for a fractional length only of a seat and back comprising a form fitted covering having a portion extending over the seat and up over a corresponding top portion of the back to drop downwardly therebehind, the top portion being united with the front side portion across the end of the back and a front and one end skirt extending from the seat portion, an elastic means engaging said skirt, extending across the front side of said seat from and approximately at the level of the lower edge of said skirt, around the end of the seat and across the back of the seat to interconnect with said skirt; a second elastic means also engaging said cover at the junction of its seat and back portions and extending along the seat at said back to interconnect with said first elastic means at the seat and removed from said cover; and a third elastic means extending downwardly on the rear side of said seat back from the corner of said back portion intermediate the sides of said back to engage with said first elastic means.

4. A cover for application to a fractional length only of an automobile front seat and back comprising an open envelope engaging over the top portion of said back and down over the front and end portions of the back and extending over the seat and downwardly from the seat on the front side and said back end side by an apron; elastic means interengaging the lower corners of said apron and extending around the front side of the seat, across its end, and around the back side of the seat whereby the skirt is is pulled snugly toward the seat at its front and end portions; elastic means interengaging said cover at the zone between the seat and its back, and extending along over the uncovered portion of the seat and down the end to interengage with said first elastic means; and a third elastic means interengaging the cover on the rear side of said back at the side of the cover removed from said back end and extending downwardly to engage with said first elastic means.

References Cited in the file of this patent

UNITED STATES PATENTS 1,771,872     Brock et al.              July 29, 1930

FOREIGN PATENTS 691,998     Germany               June 10, 1940